(12) United States Patent
Jiang et al.

(10) Patent No.: US 9,674,195 B1
(45) Date of Patent: Jun. 6, 2017

(54) USE OF HIGHLY AUTHENTICATED OPERATIONS TO DETECT NETWORK ADDRESS TRANSLATION

(71) Applicant: Symantec Corporation, Mountain View, CA (US)

(72) Inventors: Kevin B Jiang, Waltham, MA (US); Ilya Sokolov, Boston, MA (US)

(*) Notice: Subject to any disclaimer, the term of this patent is extended or adjusted under 35 U.S.C. 154(b) by 393 days.

(21) Appl. No.: 14/315,203

(22) Filed: Jun. 25, 2014

(51) Int. Cl.
*H04L 29/06* (2006.01)
(52) U.S. Cl.
CPC .............. *H04L 63/10* (2013.01); *H04L 63/08* (2013.01); *H04L 63/20* (2013.01)
(58) Field of Classification Search
CPC ....... H04L 63/20; H04L 63/102; H04L 63/08; H04L 63/10
See application file for complete search history.

(56) References Cited

U.S. PATENT DOCUMENTS

| | | | | |
|---|---|---|---|---|
| 7,433,325 B1* | 10/2008 | Sagy | ................. | H04L 29/12339 370/254 |
| 7,761,558 B1* | 7/2010 | Jindal | ................... | H04L 67/303 709/223 |
| 8,819,816 B2* | 8/2014 | Stein | ....................... | G06F 15/16 726/22 |
| 9,148,434 B2* | 9/2015 | Yu | .......................... | G06F 21/577 |
| 2005/0108551 A1* | 5/2005 | Toomey | .................. | G06F 21/31 713/185 |
| 2015/0089585 A1* | 3/2015 | Novack | ................... | H04L 63/08 726/3 |

\* cited by examiner

*Primary Examiner* — Ali Abyaneh
*Assistant Examiner* — Shaqueal Wade
(74) *Attorney, Agent, or Firm* — Patent Law Works LLP

(57) ABSTRACT

NAT systems are identified by detecting highly authenticated operations being made by multiple users from IP addresses. Users of a web service are authenticated in response to performing highly authenticated operations, such as identity proofing or multifactor authentication. Successful highly authenticated operations are tracked. A NAT system operating in conjunction with a specific IP address is identified, in response to a threshold number of different users successfully performing highly authenticated operations from the specific IP address within a specific amount of time. The total number of users behind the identified NAT system is estimated, based on the rate at which different users successfully perform operations from the specific IP address. One or more additional action(s) are taken to manage the processing of traffic originating from the specific IP address, taking into account that multiple users are operating behind the identified NAT system. An example action is rate limiting.

16 Claims, 4 Drawing Sheets

USE OF HIGHLY AUTHENTICATED OPERATIONS TO DETECT NETWORK ADDRESS TRANSLATION

TECHNICAL FIELD

This disclosure pertains generally to computer security, and more specifically to using highly authenticated operations to detect Network Address Translation ("NAT").

BACKGROUND

Most modern web services implement some kind of rate limiting to mitigate the effect of online attacks. Generally, rate limiting systems block Internet Protocol ("IP") addresses that exceed some threshold of activity. This technique is used to protect against denial of service attacks and other types of malicious activity based on bombarding a server with requests or other types of activity.

Conventional rate limiting breaks down when receiving communications from large Network Address Translation ("NAT") systems, where a large number of users appear to the web service as a single IP address. NAT is a methodology of modifying network address information in IP packet headers while they are in transit across a traffic routing device, for the purpose of remapping one IP address space into another. NAT is often used to hide an entire IP address space, usually consisting of private network IP addresses, behind a single IP address in a public address space. This mechanism can be implemented in a router that uses translation tables to map the hidden addresses into a single, visible IP address, and readdresses the outgoing IP packets on exit so they appear to originate from the routing device. In the reverse communications path, responses are mapped back to the originating IP addresses using the translation tables.

Without a reliable way to identify NAT systems and how many users are behind them, it is difficult for a web service to set appropriate rate limiting thresholds. If the threshold is set too high for the actual number of users behind the NAT, denial of service attacks and the like are not deterred. On the other hand, if the threshold is set too low, legitimate users will be blocked from using the service.

It would be desirable to address these issues.

SUMMARY

Network Address Translation ("NAT") systems are automatically identified by detecting highly authenticated operations being made by multiple users from individual Internet Protocol ("IP") addresses. As term is used herein, a "highly authenticated operation" is an authentication action that is difficult or impractical for an attacker to fake for multiple users 307 in a given amount of time. Examples of such actions can include credit card transactions, identity proofing, physical address verification, phone number verification, or two-factor authentication. The users of a web service are authenticated in response to performing highly authenticated operations. This user authentication can occur within the ordinary course of the operation of the web service. For example, the users can be prompted to perform highly authenticated operations in response to attempting to access the web service. One example of a highly authenticated operation is identity proofing of the user. This can take the form of using a communication channel other than the current online communication session in order to prove the user's identity, or dynamically generating a question on the fly for the user to answer and thereby prove the user's identity. Another example of a highly authenticated operation is multifactor authentication of the user, in which the user is authenticated based on at least a second factor in addition to a password. The additional factor can be, for example, a passcode generated by a hardware token or a biometric factor. Users can also be authenticated when engaging in financial transactions through the web service, for example on the basis of a credit card number or other form of electronic payment.

Successful highly authenticated operations performed by the users of the web service are tracked. Tracking a successful highly authenticated operation typically involves tracking the specific user that performed the operation, the IP address from which the operation originated and the time at which the operation was performed. A NAT system operating in conjunction with a specific IP address is identified, in response to a threshold number of different users successfully performing highly authenticated operations from the specific IP address within a specific amount of time. The total number of users operating from behind the identified NAT system is estimated, based on the rate at which different users successfully perform highly authenticated operations originating from the specific IP address. The formula used to make this estimation can be adjusted dynamically, and is typically a function of number of users that perform at least one successful highly authenticated operation from the specific IP address, number of successful highly authenticated operations performed from the specific IP address, and time during which the highly authenticated operations are performed from the specific IP address.

When a NAT system is identified, one or more additional action(s) are taken to manage the processing of traffic originating from the specific IP address. These additional actions take into account that multiple users are operating separate computing devices behind the identified NAT system operating in conjunction with the specific IP address, as opposed to the specific IP address being associated with a single computing device and user. In one embodiment, the additional action taken is in the form of adjusting the rate limiting policy of the web service for the specific IP address, for example by increasing the rate limiting threshold for the specific IP address, based on the estimated total number of users operating from behind the identified NAT system. Other rate limiting options are also possible, such as using Completely Automated Public Turning test to tell Computers and Humans Apart ("CAPTCHA") based rate limiting for the specific IP address.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
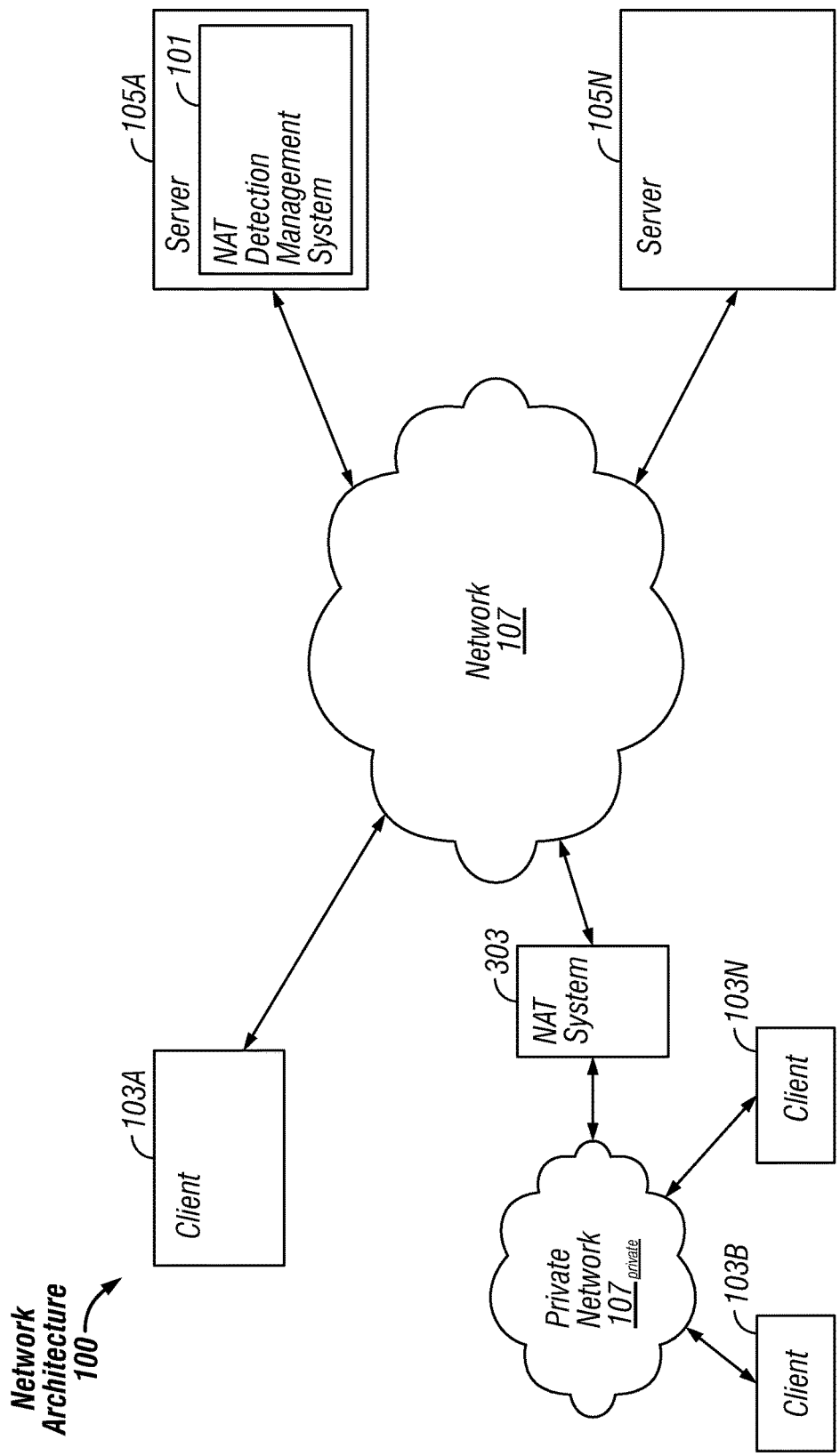
FIG. 1 is a block diagram of an exemplary network architecture in which a NAT detection management system can be implemented, according to some embodiments.

FIG. 1 is a block diagram illustrating an exemplary network architecture 100 in which a NAT detection management system 101 can be implemented. The illustrated network architecture 100 comprises multiple clients 103A, 103B and 103N, as well as multiple servers 105A and 105N. In FIG. 1, a NAT detection management system 101 is illustrated as residing on server 105A. It is to be understood that this is an example only, and in various embodiments various functionalities of this system 101 can be instantiated on a client 103, a server 105, or can be distributed between multiple clients 103 and/or servers 105.

In FIG. 1, client 103A talks to network 107 directly, whereas clients 103B and 103N talk to network $107_{PRIVATE}$, which is in turn connected to network 107 through a NAT system 301. The use of NAT systems 303 within the context of the NAT detection management system 101 is described in greater detail below in conjunction with FIG. 3. Although FIG. 1 illustrates three clients 103 and two servers 105 as an example, in practice many more (or fewer) clients 103 and/or servers 105 can be deployed. In one embodiment, network 107 is in the form of the Internet, and private network $107_{PRIVATE}$ is in the form of a private enterprise level network. Other networks 107 or network-based environments can be used in other embodiments.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can be in the form of desktop computers, laptop computers, or mobile computing devices, comprising portable computer systems capable of connecting to a network 107 and running applications. Such mobile computing devices are sometimes referred to as smartphones, although some mobile phones not so designated also have these capabilities. Tablet computers are another example of mobile computing devices.

Figure 2:
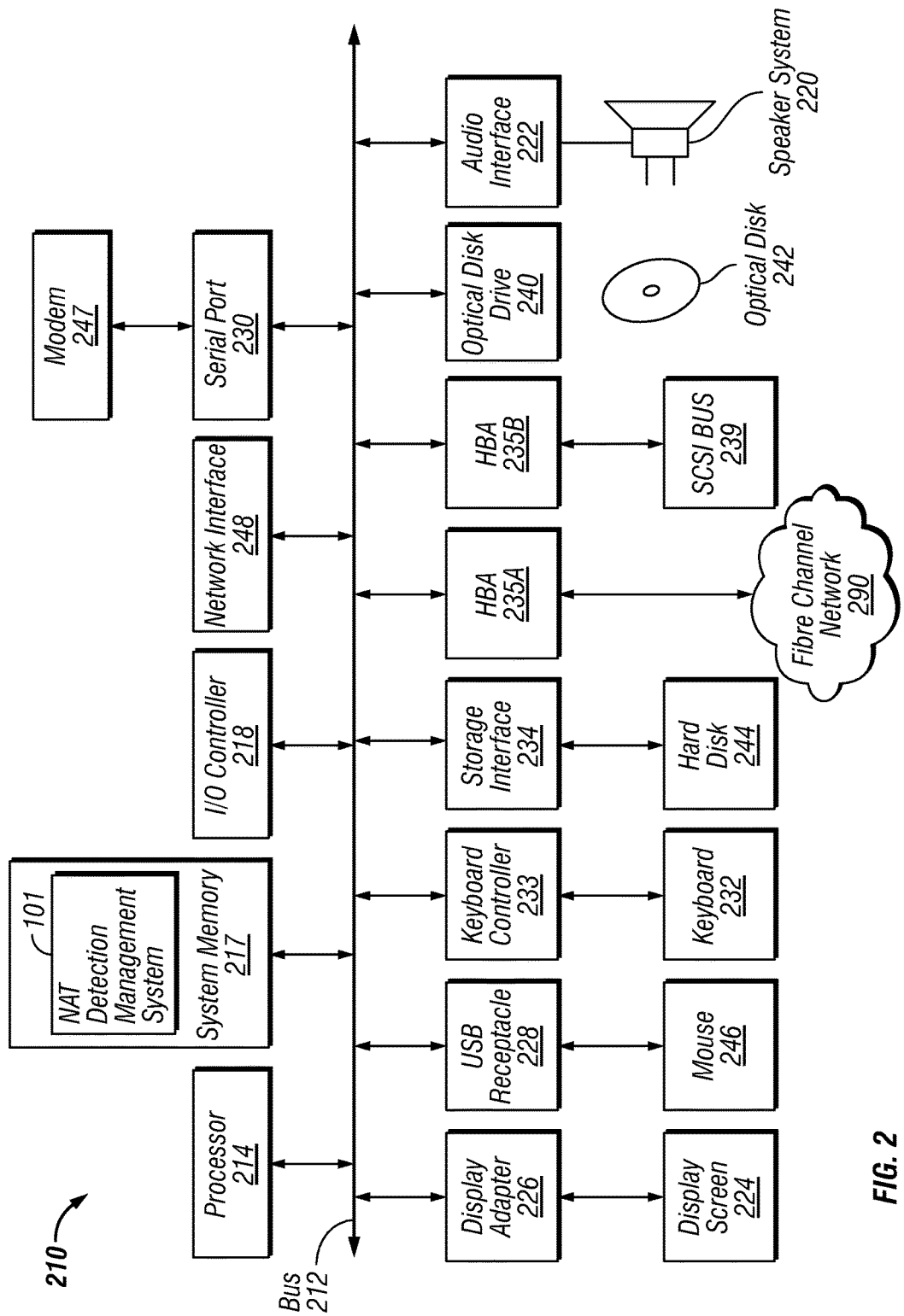
FIG. 2 is a block diagram of a computer system suitable for implementing a NAT detection management system, according to some embodiments.

FIG. 2 is a block diagram of a computer system 210 suitable for implementing a NAT detection management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) receptacles 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB receptacle 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices 307 via, e.g., USB receptacles 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the NAT detection management system 101 is illustrated as residing in system memory 217. The workings of the NAT detection management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

Figure 3:
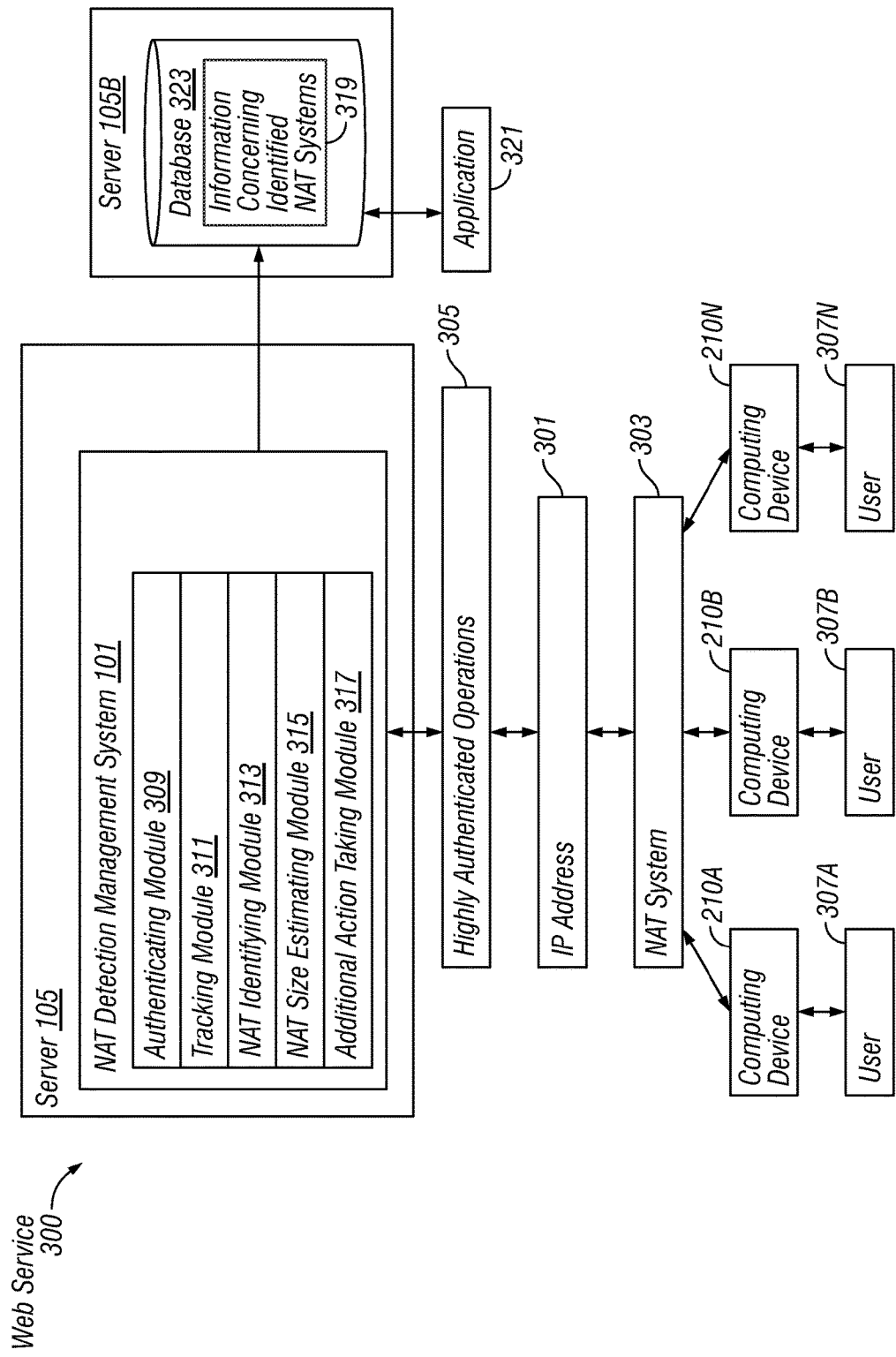
FIG. 3 is a block diagram of the operation of a NAT detection management system, according to some embodiments.

FIG. 3 illustrates the operation of a NAT detection management system 101, according to some embodiments. In FIG. 3, the NAT detection management system 101 is illustrated as residing on a server 105 and running in conjunction with a web service 300. As described above, the functionalities of the NAT detection management system 101 can reside on a client 103, a server 105, or be distributed between multiple computer systems 210, including within a cloud-based computing environment in which the functionality of the NAT detection management system 101 is provided as a service over a network 107. It is to be understood that although the NAT detection management system 101 is illustrated in FIG. 3 as a single entity, the illustrated NAT detection management system 101 represent a collection of functionalities, which can be instantiated as a single or multiple modules as desired (an instantiation of specific, multiple modules of the NAT detection management system 101 is illustrated in FIG. 3). In some embodiments, the different modules of the NAT detection management system 101 can reside on different computing devices 210 as desired. It is to be understood that the modules of the NAT detection management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the NAT detection management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the NAT detection management system 101 identifies NAT systems 303 by detecting highly authenticated operations 305 being made by multiple users 307 from individual IP addresses 301. When a threshold number of highly authenticated operations 305 made by different users 307 originate from a single IP address 301 within a given time period, it can be reliably concluded that the IP address 301 is running a NAT system 303, with multiple users 307 operating multiple computing devices 210 behind it. Based on the number of users who perform highly authenticated operations 305 from the single IP address 301 within measured periods of time, the NAT detection management system 101 can estimate the number of computing devices 210 behind the detected NAT system 303. The NAT detection management system 101 can then take appropriate actions based on having identified the NAT system 303, for example by adjusting the rate limiting policy for the IP address 301 to reflect the estimated number of users 307.

An authenticating module 309 of the NAT detection management system 101 uses highly authenticated operations 305 to authenticate users 307 of the web service 300. Note that this authentication can occur within the ordinary course of the operation of the web service 300. For example, when a user 307 operating a computer 210 attempts to access the web service 300 in a manner requiring authentication (e.g., the user 307 attempts to login to his/her account), the authenticating module 309 can prompt the user to perform a highly authenticated operation 305. The user 307 can, for example, utilize a browser (not illustrated) to navigate to a login screen on the web service 300 that requests entry of authentication credentials. The authenticating module 309 can, in this context, prompt the user to execute a highly authenticated operation, such as two-factor authentication as described in more detail below. In another scenario, the authenticating module 309 can authenticate users 307 making purchases or engaging in other financial transactions through the web service 300, for example using a credit card number or other form of electronic payment. As term is used herein, a "highly authenticated operation" is an authentication action that is difficult or impractical for an attacker to fake for multiple users 307 in a given amount of time. Examples of such actions can include credit card transactions, identity proofing, physical address verification, phone number verification, or two-factor authentication.

Identity proofing is requiring a user to prove that s/he is who s/he claims to be (e.g., before being granted access to the web service 300 or the like). In different embodiments, the authenticating module 309 can use different identity proofing methodologies in this context. One example is out-of-band proofing, in which a channel other than the online communication session is used to contact the user 307 for the purpose of identity proofing. More specifically, the authenticating module 309 can attempt the contact via a phone number which is on record as being that of the user 307 (this can be in the form of placing an automated call or sending a text message to the number). In other embodiments, other out-of-bound communication channels are used, such as sending physical mail to an address on record as belonging to the user 307. The out-of-bound communication can be used to direct the user 307 to send a reply message or make a reply phone call, to provide a onetime use code for the user 307 to enter through the in-band communication, or to take other additional actions to prove his/her identity. Although not immune to attack (e.g., a fraudster could have obtained unauthorized access to the user's phone or address), out-of-band proofing adds a substantial level of security, and is difficult to forge for multiple users 307 in a short window of time (e.g., it is hard for an attacker to fake many different phone numbers associated with unique devices, or multiple physical addresses).

Other forms of identity proofing can be used in other embodiments, such dynamic knowledge based authentication, in which the authenticating module 309 dynamically generates a question on the fly for the user 307 to answer. The question is generated such that the answer should be known to the user 307 but typically could not by answered by a fraudster in realtime. In dynamic knowledge based authentication, rather than having the user 307 select the questions and supply the answers in advance, the questions and answers are based on information gleaned by the authenticating module 309 from public records or a third party service. Examples of dynamically generated questions are "What was the amount of your last mortgage payment?" or "What state did you live in before you moved to your current state of residence?" Typically, a question is used only once for a user 307, and the answer is not stored. In other embodiments, static knowledge based authentication is used instead, although this is less robust than the dynamic variety.

In some embodiments, second factor authentication is considered a highly authenticated operation 305. In these embodiments, the authenticating module 309 authenticates the user 307 based on a second factor in addition to a password (the first factor), thereby providing multifactor authentication of the user 307. More specifically, the authenticating module 309 receives a second factor from the user 307 (for example, in response to a prompt), and uses the second factor to authenticate the user 307. Different second factors can be used in different embodiments.

In some embodiments, the second factor is in the form of a number (sometimes called a passcode) generated and displayed by a hardware token, which has been physically provided to the user 307 through a secure channel. The hardware token derives the number from a secret that is known only to itself and the authenticating module 309 (a shared secret), through a cryptographic process. The secret is hashed or otherwise cryptographically combined with a dynamic challenge, resulting in the passcode which is displayed to the user 307 on a small screen on the token. The authenticating module 309 prompts the user 307 to enter the displayed passcode. The authenticating module 309 also performs the same cryptographic process based on the shared secret and challenge, resulting in the matching passcode. Thus, the authenticating module 309 is able to determine whether the user 307 is in possession of the hardware token. Because the challenge is dynamic in nature and changes over time, the hardware token typically generates a different passcode each time the user 307 is authenticated.

In other embodiments, the second factor takes the form of a passcode generated by a hardware token that is communicatively coupled to the user's computer 210 (via a physical connection such as USB, an audio port, a Dallas 1-wire interface, a smartcard or magnetic card reader, or wirelessly through a protocol such as Bluetooth or Near Field Communication). In the case of such connected hardware tokens, rather than display the passcode to the user 307 to be entered, the connected hardware token provides it to the user's computer 210 directly.

In other embodiments, biometric data is used for the second authentication factor. For example, the user 307 can provide a fingerprint, voiceprint, iris scan or other biometric factor, which the authenticating module 309 matches against stored valid biometric data concerning the user 307. Yet other second factors are utilized in other embodiments, and some embodiments require more than two authentication factors (e.g., password, hardware token generated passcode and fingerprint). How many and which specific authentication factors to use is a variable design parameter.

The specific actions that are considered highly authenticated operations 305 can vary between embodiments as desired. In general, authentication actions that are not difficult for an attacker to forge for multiple users are excluded. Examples of such excluded actions are authentication using phone numbers from services such as Google Voice or software generated 2FA tokens such as VIP mobile apps. This is the case because an attacker can generate many such items automatically, and thus easily simulate a large number of users 307 from behind a single IP address 301.

A successful operations tracking module 311 of the NAT detection management system 101 operates in conjunction with the authenticating module 309, and tracks whenever a user 307 successfully performs a highly authenticated operation 305 (for example, whenever a user 307 passes an identity proofing verification or successfully executes a credit card transaction). Whenever this occurs, the successful operations tracking module 311 tracks the user 307 who performed the highly authenticated operation 305 (e.g., according to name or other identifier utilized in the authentication operation 305), the IP address 301 from which the operation 305 originated, and the time at which the operation 305 occurred. By tracking this information, the number of different users 307 that perform successful highly authenticated operations 305 from a single IP address 301 within a given window of time is determined. Whenever a threshold number of users 307 perform successful highly authenticated operations 305 from a single IP address 301 within a specific amount of time, a NAT identifying module 313 of the NAT detection management system 101 identifies a NAT system 303 as operating in conjunction with the IP address. In other words, the NAT identifying module 313 identifies the specific IP address 301 from which the requisite number of different users 307 successfully performed highly authenticated operations 305 within the specific period of time as an IP address 301 which fronts a NAT system 303. The threshold number of users 307 (e.g., three, ten, fifty) and the measured period of time (e.g., five minutes, one hour, one day) are variable design parameters which can be adjusted up and/or down separately or in conjunction with each other as desired.

In order for an attacker to successfully trick the NAT detection management system 101 into treating a personal IP address 301 as a NAT system 303, s/he would have to create multiple users 307 and fake these highly authenticated operations 305 for each of them in a requisite period of time. Because highly authenticated operations 305 are difficult to fake for large numbers of users 307 in short amounts of time, the successful execution of such operations 305 by a requisite number of users 307 from a single IP address 301 within a sufficiently short period of time is considered reliable evidence that a NAT system 303 utilized by multiple users 307 is behind the IP address 301.

Once a NAT system 303 has been identified, a NAT size estimating module 315 of the NAT detection management system 101 can estimate the number of users behind the NAT system 303, based on the rate at which different users 307 perform highly authenticated operations 305 originating from the IP address 301. The specific formula used to estimate the NAT size (e.g., the total number of users 307 operating from behind the identified NAT system 303) can vary between embodiments, and can be adjusted over time as desired. Such a formula can be a function of number of users 307 that perform at least one successful highly authenticated operation 305, number of successful highly authenticated operations 305, and time.

After having identified and estimated the size of a NAT system 303 behind a given IP address 301, an additional action taking module 317 of the NAT detection management system 101 can take appropriate additional action to properly manage the detected NAT system 303. For example, the additional action taking module 317 can adjust the rate limiting policy of the corresponding web service 300 for the given IP address 301, taking into account that multiple users 307 are operating from behind the IP address 301. Note that the specific action to take to alter the rate limiting policy is a variable design parameter. For example, in one embodiment the additional action taking module 317 can increase the rate limiting threshold for the IP address 301, based on the estimated size of the NAT system 303. In another embodiment, the additional action taking module 317 can use Completely Automated Public Turning test to tell Computers and Humans Apart ("CAPTCHA") based rate limiting, instead of blocking requests over the threshold for the IP address 301 (e.g., rather than increasing the threshold for requests from the IP address 301, applying a CAPTCHA such as prompting the user 307 to type the letters of a distorted image for requests over the threshold). In yet another embodiment, the additional action taking module 317 could disable rate limiting for the IP address 301 altogether, and instead monitor the IP address 301 for suspicious activity in a different manner, such as applying heuristic based analysis. It is to be further understood that adjusting rate limiting activity for an IP address 301 determined to front a NAT system 303 is only one example use case for the NAT detection management system 101. In other use cases, once NAT systems 303 have been detected by the NAT detection management system 101 as described above, other responsive actions to manage the identified NAT systems 303 can be taken as desired. The NAT detection management system 101 has identified a NAT system 303 with an estimated number of total users 307 as operating behind a single, specific IP address 301. In response, the additional action taking module 317 can take any appropriate action to manage the processing of traffic originating from that IP address 301, in order to take into account that multiple users 307 are operating separate computing devices 210 behind the single IP address 301, as opposed to the IP address 301 being associated with a single computing device 210 and user 307. In some embodiments, the additional action taking module 317 shares information 319 concerning identified NAT systems 303 with other applications 321 that do not specifically implement the detection feature. This can be implemented, for example, by storing this information 319 in a database 323 or other suitable storage component on a server 105 (or combination of computing devices 210) such that it is accessible to other applications 321 with which the information is to be shared.

Figure 4:
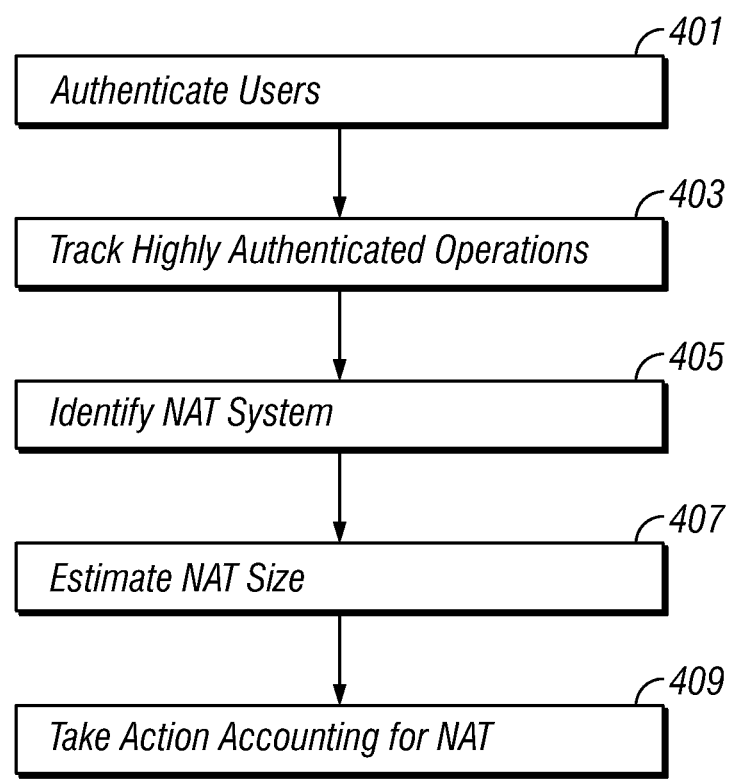
FIG. 4 is a flowchart of the operation of a NAT detection management system, according to some embodiments.

FIG. 4 illustrates steps of the operation of a NAT detection management system 101, according to some embodiments. The authenticating module 309 authenticates 401 users 307 of a web service 300 in response to users 307 having successfully performed highly authenticated operations 305. The successful operations tracking module 311 tracks 403 successful highly authenticated operations 305 performed by the users 307 of the web service 300 (tracking a successful highly authenticated operation 305 involves tracking the specific user 307 that performed the operation, the IP address 301 from which the operation originated and the time at which the operation was performed). The NAT identifying module 313 identifies 405 a NAT system 303 as operating in conjunction with a specific IP address 301, in response to a threshold number of different users 307 successfully performing highly authenticated operations 305 from the specific IP address 301 within a specific amount of time. The NAT size estimating module 315 estimates 407 the total number of users 307 operating from behind the identified NAT system 303, based on the rate at which different users 307 successfully perform highly authenticated operations 305 originating from the specific IP address 301. The additional action taking module 317 takes 409 at least one additional action to manage the processing of traffic originating from the specific IP address 301. Such additional actions take into account that multiple users 307 with separate computing devices 210 are behind the identified NAT system 303 operating in conjunction with the specific IP address 301, as opposed to the specific IP address 301 being associated with a single computing device 210 and user 307.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for automatically identifying Network Address Translation ("NAT") systems by detecting highly authenticated operations being made by multiple users from individual Internet Protocol ("IP") addresses, the method comprising the steps of:

Authenticating users of a web service, by a computer, wherein authenticating the users further comprises authenticating the users in response to the users having successfully performed a highly authenticated operation, the highly authenticated operation being at least one of: a financial transaction, an identity proofing, and a multifactor authentication;

tracking, by the computer, successful highly authenticated operations performed by the users of the web service, wherein tracking the successful highly authenticated operations further comprises tracking a specific user that performed the highly authenticated operation, an IP address from which the highly authenticated operation originated and a time at which the highly authenticated operation was performed;

identifying, by the computer, a NAT system as operating in conjunction with a specific IP address, in response to a threshold number of different users successfully performing highly authenticated operations from the specific IP address within a specific amount of time;

estimating, by the computer, a total plural number of users operating from behind the identified NAT system, based on a rate at which the different users successfully perform highly authenticated operations originating from the specific IP address, wherein the highly authenticated operations cannot be automatically generated to simulate multiple users behind a single IP address; and adjusting a rate limiting policy of the web service for the specific IP address by performing at least one of: increasing a rate limiting threshold for the specific IP address, using Completely Automated Public Turning test to tell Computers and Humans Apart ("CAPTCHA") based rate limiting for the specific IP address, and disabling rate limiting for the specific IP address.

2. The method of claim 1, wherein authenticating the users of the web service further comprises:

authenticating users within an ordinary course of operation of the web service.

3. The method of claim 1, wherein authenticating the users of the web service further comprises:

prompting the users to perform the highly authenticated operation in response to the users attempting to access the web service; and authenticating the users in response to the users successfully performing the highly authenticated operation.

4. The method of claim 1, wherein authenticating the users of the web service further comprises:

authenticating the users engaging in financial transactions through the web service, wherein the users engaging in the financial transaction through the web service further comprises the users utilizing a credit card number or other form of electronic payment.

5. The method of claim 1, wherein authenticating the users in response to the users having successfully performed the highly authenticated operation further comprises:

identity proofing the users, by the computer.

6. The method of claim 5, wherein identity proofing the users further comprises:
  using a communication channel other than a current online communication session in order to prove identity of the users.

7. The method of claim 5, wherein identity proofing of the users further comprises:
  dynamically generating a question on the fly for the users to answer and thereby proving identity of the users.

8. The method of claim 1, wherein authenticating the users in response to the users having successfully performed the highly authenticated operation further comprises:
  providing multifactor authentication of the users by authenticating the users based on at least a second factor in addition to a password.

9. The method of claim 8, wherein authenticating the users based on at least the second factor in addition to the password further comprises:
  authenticating the users based on a passcode generated by a hardware token.

10. The method of claim 8, wherein authenticating the users based on at least the second factor in addition to the password further comprises:
  authenticating the users based on a biometric factor.

11. The method of claim 1, wherein estimating the total number of users operating from behind the identified NAT system, based on the rate at which different users successfully perform highly authenticated operations originating from the specific IP address over time further comprises:
  adjusting, over time, a formula used to estimate the total number of users operating from behind the identified NAT system, wherein the formula comprises a function of number of users that perform at least one successful highly authenticated operation from the specific IP address, number of successful highly authenticated operations performed from the specific IP address, and time during which the highly authenticated operations are performed from the specific IP address.

12. The method of claim 1,
  wherein increasing the rate limiting threshold for the specific IP address is based on the estimated total plural number of users operating from behind the identified NAT system.

13. At least one non-transitory computer readable-storage medium for automatically identifying Network Address Translation ("NAT") systems by detecting highly authenticated operations being made by multiple users from individual Internet Protocol ("IP") addresses, the at least one non-transitory computer readable-storage medium storing computer executable instructions that, when loaded into computer memory and executed by at least one processor of a computing device, cause the computing device to perform the following steps:
  authenticating users of a web service, by the computing device, wherein authenticating the users further comprises authenticating the users in response to the users having successfully performed a highly authenticated operation, the highly authenticated operation being at least one of: a financial transaction, an identity proofing, and a multifactor authentication;
  tracking, by the computing device, successful highly authenticated operations performed by the users of the web service, wherein tracking the successful highly authenticated operations further comprises tracking a specific user that performed the highly authenticated operation, an IP address from which the highly authenticated operation originated and a time at which the highly authenticated operation was performed;
  identifying, by the computing device, a NAT system as operating in conjunction with a specific IP address, in response to a threshold number of different users successfully performing highly authenticated operations from the specific IP address within a specific amount of time;
  estimating, by the computing device, a total plural number of users operating from behind the identified NAT system, based on a rate at which the different users successfully perform highly authenticated operations originating from the specific IP address,
  wherein the highly authenticated operations cannot be automatically generated to simulate multiple users behind a single IP address; and
  adjusting a rate limiting policy of the web service for the specific IP address by performing at least one of: increasing a rate limiting threshold for the specific IP address, using Completely Automated Public Turning test to tell Computers and Humans Apart ("CAPTCHA") based rate limiting for the specific IP address, and disabling rate limiting for the specific IP address.

14. The at least one non-transitory computer readable-storage medium of claim 13, wherein estimating the total number of users operating from behind the identified NAT system, based on the rate at which different users successfully perform highly authenticated operations originating from the specific IP address over time further comprises:
  adjusting, over time, a formula used to estimate the total number of users operating from behind the identified NAT system, wherein the formula comprises a function of number of users that perform at least one successful highly authenticated operation from the specific IP address, number of successful highly authenticated operations performed from the specific IP address, and time during which the highly authenticated operations are performed from the specific IP address.

15. The at least one non-transitory computer readable-storage medium of claim 13,
  wherein increasing the rate limiting threshold for the specific IP address is based on the estimated total plural number of users operating from behind the identified NAT system.

16. A computer system for automatically identifying Network Address Translation ("NAT") systems by detecting highly authenticated operations being made by multiple users from individual Internet Protocol ("IP") addresses, the computer system comprising:
  at least one processor;
  a system memory;
  an authenticating module residing in the system memory, the authenticating module being programmed to authenticate users of a web service, wherein authenticating the users further comprises authenticating the users in response to the users having successfully performed a highly authenticated operation, the highly authenticated operation being at least one of: a financial transaction, an identity proofing, and a multifactor authentication;
  a successful operations tracking module residing in the system memory, the successful operations tracking module being programmed to track successful highly authenticated operations performed by the users of the web service, wherein tracking the successful highly authenticated operations further comprises tracking a specific user that performed the highly authenticated operation, an IP address from which the highly authenticated operation originated and a time at which the highly authenticated operation was performed;

a NAT identifying module residing in the system memory, the NAT identifying module being programmed to identify a NAT system as operating in conjunction with a specific IP address, in response to a threshold number of different users successfully performing highly authenticated operations from the specific IP address within a specific amount of time;

a NAT size estimating module estimating, residing in the system memory, the NAT size estimating module being programmed to estimate a total plural number of users operating from behind the identified NAT system, based on a rate at which the different users successfully perform highly authenticated operations originating from the specific IP address, wherein the highly authenticated operations cannot be automatically generated to simulate multiple users behind a single IP address; and adjusting a rate limiting policy of the web service for the specific IP address by performing at least one of: increasing a rate limiting threshold for the specific IP address, using Completely Automated Public Turning test to tell Computers and Humans Apart ("CAPTCHA") based rate limiting for the specific IP address, and disabling rate limiting for the specific IP address.

\* \* \* \* \*